(12) United States Patent
Cushway

(10) Patent No.: US 7,054,623 B1
(45) Date of Patent: May 30, 2006

(54) GRAPEVINE DRIVEN UPDATING TECHNIQUE

(75) Inventor: Alan Cushway, Punchbowl (AU)

(73) Assignee: Nokia Corporation, Espoo (FI)

( * ) Notice: Subject to any disclaimer, the term of this patent is extended or adjusted under 35 U.S.C. 154(b) by 609 days.

(21) Appl. No.: 09/850,101

(22) Filed: May 8, 2001

(51) Int. Cl.
*H04M 3/00* (2006.01)

(52) U.S. Cl. ........................ 455/419; 455/418; 455/41.2

(58) Field of Classification Search ................ 455/419, 455/420, 425, 418, 426.1; 379/59
See application file for complete search history.

(56) References Cited

U.S. PATENT DOCUMENTS

| | | | | |
|---|---|---|---|---|
| 5,524,276 A | * | 6/1996 | Littig et al. | 455/418 |
| 5,610,973 A | * | 3/1997 | Comer | 455/413 |
| 5,812,946 A | * | 9/1998 | Nakabayashi et al. | 455/426.1 |
| 6,023,620 A | * | 2/2000 | Hansson | 455/419 |
| 6,041,229 A | * | 3/2000 | Turner | 455/420 |
| 6,463,142 B1 | * | 10/2002 | Kilp | 379/201.06 |
| 6,493,550 B1 | * | 12/2002 | Raith | 455/422.1 |
| 6,533,171 B1 | | 3/2003 | Porter | |
| 6,622,018 B1 | * | 9/2003 | Erekson | 455/420 |
| 2002/0004386 A1 | | 1/2002 | Simon | |
| 2002/0160765 A1 | * | 10/2002 | Okajima | 455/419 |

FOREIGN PATENT DOCUMENTS

| | | |
|---|---|---|
| DE | 195 29 336 A1 | 2/1997 |
| WO | WO 99/34631 | 7/1999 |
| WO | WO 99/50807 | 10/1999 |

* cited by examiner

*Primary Examiner*—Temica Beamer
(74) *Attorney, Agent, or Firm*—Banner & Witcoff, Ltd.

(57) ABSTRACT

A grapevine driven updating technique includes providing a first piece of updated data to a first mobile terminal and then initiating an inquiry from the first mobile terminal to a second mobile terminal via a communication link, the inquiry asking the second mobile terminal whether it wishes to receive the first updated piece of data. A response is then forwarded from the second mobile terminal to the first mobile terminal via the communication link in response to the inquiry from the first mobile terminal, the response acknowledging that it wishes to receive the first updated piece of data; and the first updated piece of data is forwarded from the first mobile terminal to the second mobile terminal via the communication link. In a similar fashion, the first updated piece of data may be forwarded from the second mobile terminal to a third mobile terminal which in turn can forward the first updated piece of data to a fourth mobile terminal, etc.

71 Claims, 3 Drawing Sheets

TO STEPS 255 AND 270

GRAPEVINE DRIVEN UPDATING TECHNIQUE

BACKGROUND OF THE INVENTION

1. Field of the Invention

The present invention relates to grapevine driven updating technique and more particularly, the present invention relates to an updating technique which allows mobile terminals which are in close proximity to each other to update each other with newer versions of data or software that they share.

2. Description of the Background

Presently, the trend has been for mobile terminals to store more and more data and software. This data may include electronic business cards and other information. Software is constantly being updated and corrected when necessary.

U.S. Pat. No. 6,023,620 to Hansson discloses a method for downloading control software to a cellular telephone. In the method of Hansson, new or updated software must be transmitted individually from an update server processor to each in every cellular telephone requiring software updating.

European Patent Application No. EP 895157 to Maeda discloses a remote maintenance method and apparatus which, in a fashion similar to Hansson, also transmits new or updated software individually in a wired or wireless network.

German Patent No. DE 19741703 discloses loading operating software into a mobile telephone and then transferring software to the telephone via a wireless interface and then temporarily storing software in a first memory area and then loading software in a second area after successful loading.

These earlier disadvantageous systems, among others, made it very difficult to update data and software for mobile terminals in that they had to update each mobile terminal individually. Alternatively, they could broadcast new or updated software to all mobile terminals. However, this requires an enormous amount of wireless resources and in addition, broadcasting such new or updated software will not reach mobile terminals which are out of the service area or turned off.

Another alternative which has been used in the past is to provide a Web site containing software updates or new software for use by mobile terminals. This requires each mobile terminal user to periodically check the Web site to determine if the mobile terminal software requires updating or if new software is to be added. Additionally, the software provider cannot easily determine if all of the mobile terminals needing new software or updated software have received such new or updated software.

SUMMARY OF THE INVENTION

In view of the disadvantages noted above, it is an object of the present invention to provide an updating technique which allows mobile terminals which are in close proximity to each other to update each other with newer versions of data or software that they share.

In accordance with the present invention, utilizing a short range communication method, such as a low-power RF system (e.g.-the Bluetooth System), or an optical system such as an infrared system, mobile terminals which are in close proximity with each other conduct handshaking arrangements to determine shared data and software. The terminals then update each other so that they each have the latest versions of the shared data and software.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DESCRIPTION OF PREFERRED EMBODIMENTS

Figure 1:
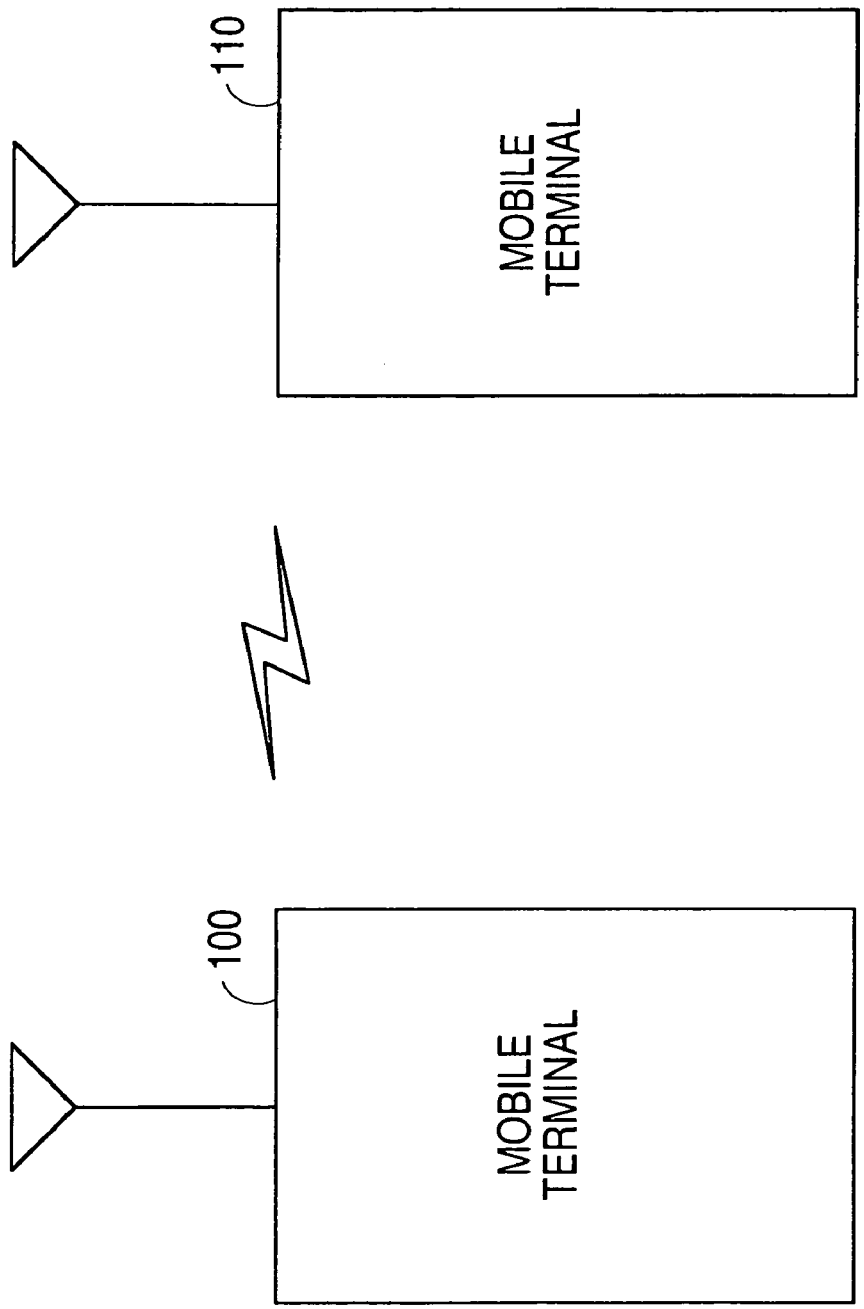
FIG. 1 is a block diagram of a pair of mobile terminals which may be used with the technique of the present invention.

Before beginning a detailed description of the subject invention, mention of the following is in order. When appropriate, like reference numerals and characters may be used to designate identical, corresponding, or similar components in differing drawing figures.

Furthermore, in the detailed description to follow, example sizes/models/values/ranges may be given, although the present invention is not limited thereto.

FIG. 1 is a block diagram of a pair of mobile terminals, 100 and 110, which may be used with the technique of the present invention. Mobile telephones and many other mobile and non-mobile terminals will soon have low-power RF transceivers, such as the Bluetooth System, contained therein. Alternatively, these terminals may have infrared transceivers contained therein. These low-power RF transceivers or infrared transceivers allow these terminals to communicate with each other when they are in close proximity to each other. Furthermore, these terminals may also have Internet access capabilities and may also have various pieces of data and software installed on them by the user.

One example of such pieces of data would be electronic business cards stored in a mobile terminal. If a user has electronic business card containing various information, such as the user's name and business association and address and telephone number and e-mail address and facsimile number, etc., and if the user has recently made changes to the information contained within his electronic business card, it would be advantageous for the user to be able to automatically update his electronic business card stored in a terminal of a second person who the user has come in contact with. Furthermore, it would be advantageous for the second person who has the updated electronic business card stored in his terminal to automatically update the user's electronic business card stored in a third person's terminal upon the second person coming in contact with the third person. This updating would be effected by the technique of the present invention.

Thus, by updating the electronic business card stored in the user's terminal, the user can cause an update to propagate out geometrically so as to hopefully update most of the terminals having the user's electronic business card stored therein. This is very useful in an office situation in which a group of people share many of the same electronic business cards. When one person updates has electronic business card, the updated electronic business card should propagate outward very quickly.

Another example would be if a user updated a piece of software contained within his terminal. The technique of the present invention would allow the user to automatically update the same piece of software contained within a terminal of a second person who the user has come in contact with. The second person would then be able to automatically update the same piece of software contained within a terminal of a third person who the second person has come in contact with, thereby allowing the updated software to propagate outward very quickly in a geometric fashion.

Figure 2A:
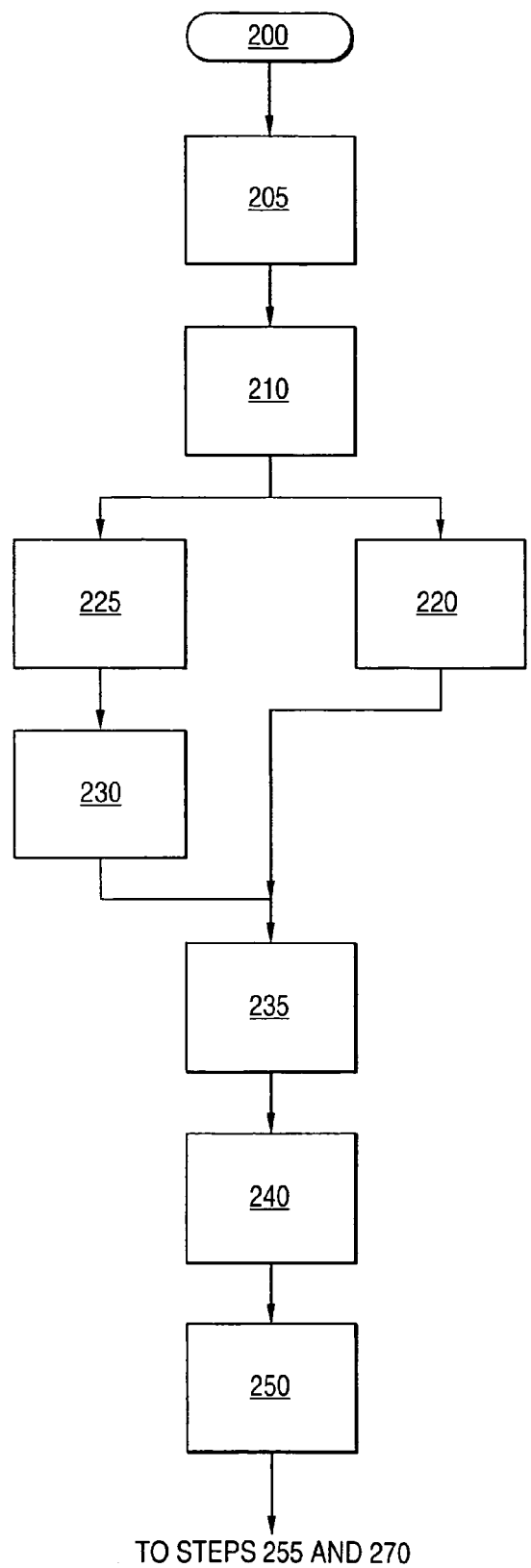
FIGS. 2A and 2B together form a flowchart illustrating one example embodiment in accordance with the technique of the present invention.
Figure 2B:
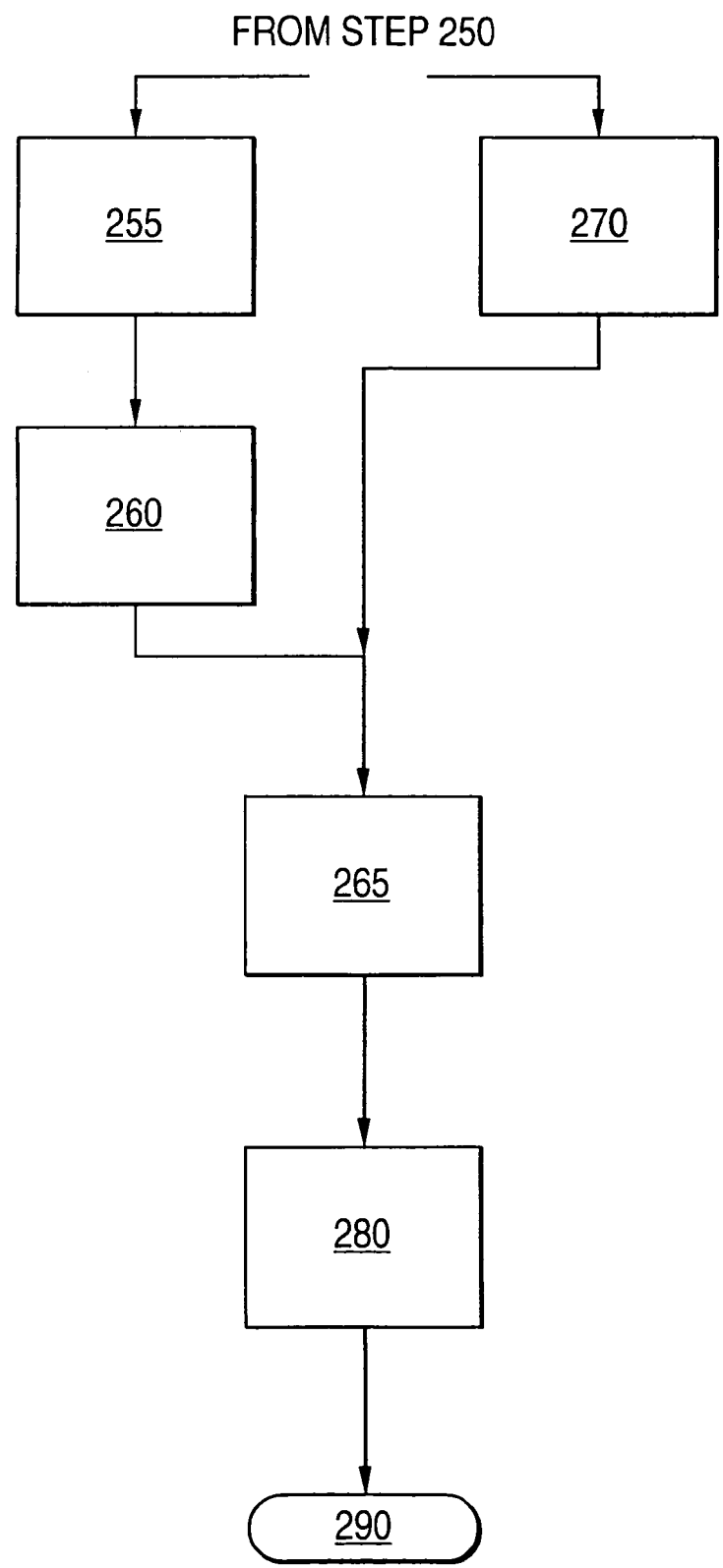

FIGS. 2A and 2B together form a flowchart illustrating one specific example embodiment in accordance with the technique of the present invention. The example embodiment discusses the use of the Bluetooth System for wireless communication between the terminals. However, as noted above, the use of the Bluetooth System is purely for exemplary purposes and the present invention is not limited thereto.

The details of the Bluetooth System have not been included for the sake of brevity. The Specification of the Bluetooth System, Volumes 1 and 2, Version 1.1, issued Feb. 22, 2001, is readily available on the Bluetooth Website: http://www.bluetooth.com.

Referring to FIGS. 2A and 2B, in step 200, the procedure in accordance with one example of the technique of the present invention begins.

In step 205, the mobile terminal 100 initiates the updating process. For example, the Bluetooth System includes an arrangement which allows one mobile terminal to detect the presence of another mobile terminal within its range. Accordingly, the mobile terminal 100 can initiate the updating process upon the detection of the presence of the mobile terminal 110 within its range. Alternatively, the mobile terminal 100 can initiate the updating process every predetermined time interval, such as once every minute.

In step 210, the mobile terminal 100 sends an inquiry to the mobile terminal 110. Depending on the protocol of the communication link between the mobile terminal 100 and the mobile terminal 110, the inquiry may merely ask if mobile terminal 110 wishes to be updated or may ask if mobile terminal 110 wishes to the updated and includes a list of data or software presently stored in the mobile terminal 100 and their version numbers.

In step 220, the mobile terminal 110 responds to the inquiry from the mobile terminal 100 if the mobile terminal 110 is in an automatic mode which allows it to automatically update its data or software upon an inquiry from another mobile terminal.

Alternatively, in step 225, the mobile terminal 110 informs its user of the inquiry from the mobile terminal 100 with an audible tone or visual indicator or alphanumeric notification on the display of the mobile terminal 110. Then, in step 230, the user manually causes the mobile terminal 110 to respond to the inquiry from the mobile terminal 100.

Not shown in FIGS. 2A and 2B are additional handshaking steps between the mobile terminal 100 and the mobile terminal 110 if the inquiry by the mobile terminal 100 did not include a list of the data or software stored in the mobile terminal 100 and their version numbers.

In step 235, the mobile terminal 110 informs the mobile terminal 100 of those pieces of data or software which it wishes to receive updates on. In step 240, the mobile terminal 100 forwards the updates to the mobile terminal 110.

In step 250, the mobile terminal 110 sends an inquiry to the mobile terminal 100 which corresponds to the inquiry from the mobile terminal 100 to the mobile terminal 110 in step 210.

Steps 255, 260, 265, 270, and 280 respectively correspond to steps 225, 230, 235, 220, and 240 with the difference being that the operations of the mobile terminal 100 and the mobile terminal 110 are reversed. That is, the mobile terminal 110 forwards the updates to the mobile terminal 100.

The process is then ended in step 290.

Note that steps 250–280 do not necessarily automatically follow step 240. That is, the process can end after step 240 and a new process initiated by the mobile terminal 110 starting at the equivalent of step 205.

The pieces of data or software to be updated from one mobile terminal to another may include, for example, electronic business cards stored in the mobile terminals. In addition, commonly used software could be updated with newer versions of the same software or software patches could be added or even operating system upgrades could be fowarded from one mobile terminal to another.

This includes the description of the example embodiment. Although the present invention has been described with reference to an illustrative embodiment thereof, issued he understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A grapevine driven updating method comprising:
    providing a first piece of updated data to a first mobile terminal;
    initiating an inquiry from the first mobile terminal to a second mobile terminal via a communication link, the inquiry asking the second mobile terminal whether it wishes to receive the first updated piece of data;
    forwarding a response from the second mobile terminal to the first mobile terminal via the communication link in response to the inquiry from the first mobile terminal, the response acknowledging that it wishes to receive the first updated piece of data; and
    forwarding the first updated piece of data from the first mobile terminal to the second mobile terminal via the communication link.

2. The method of claim 1, further comprising:
    initiating an inquiry from the second mobile terminal to the first mobile terminal via the communication link, the inquiry asking the first mobile terminal whether it wishes to receive a second updated piece of data;
    forwarding a response from the first mobile terminal to the second mobile terminal via the communication link in response to the inquiry from the second mobile terminal, the response acknowledging that it wishes to receive the second updated piece of data; and
    forwarding the second updated piece of data from the second mobile terminal to the first mobile terminal via the communication link.

3. The method of claim 1, further comprising:
  initiating an inquiry from the second mobile terminal to a third mobile terminal via the communication link, the inquiry asking the third mobile terminal whether it wishes to receive the first updated piece of data;
  forwarding a response from the third mobile terminal to the second mobile terminal via the communication link in response to the inquiry from the second mobile terminal, the response acknowledging that it wishes to receive the first updated piece of data; and
  forwarding the first updated piece of data from the second mobile terminal to the third mobile terminal via the communication link.

4. The method of claim 1, wherein the communication link comprises a low-power RF transmission system.

5. The method of claim 4, wherein the low-power RF system comprises the Bluetooth System.

6. The method of claim 1, wherein the communication link comprises an optical transmission system.

7. The method of claim 6, wherein the optical transmission system comprises an infrared transmission system.

8. The method of claim 2, wherein the communication link comprises a low-power RF transmission system.

9. The method of claim 8, wherein the low-power RF system comprises the Bluetooth System.

10. The method of claim 2, wherein the communication link comprises an optical transmission system.

11. The method of claim 10, wherein the optical transmission system comprises an infrared transmission system.

12. The method of claim 3, wherein the communication link comprises a low-power RF transmission system.

13. The method of claim 12, wherein the low-power RF system comprises the Bluetooth System.

14. The method of claim 3, wherein the communication link comprises an optical transmission system.

15. The method of claim 14, wherein the optical transmission system comprises an infrared transmission system.

16. The method of claim 1, wherein initiating an inquiry comprises forwarding an inquiry via the communication link upon detection of another mobile terminal being connected to the communication link.

17. The method of claim 1, wherein initiating an inquiry comprises forwarding an inquiry via the communication link at preset time intervals.

18. The method of claim 2, wherein initiating an inquiry comprises forwarding an inquiry via the communication link upon detection of another mobile terminal being connected to the communication link.

19. The method of claim 2, wherein initiating an inquiry comprises forwarding an inquiry via the communication link at preset time intervals.

20. The method of claim 3, wherein initiating an inquiry comprises forwarding an inquiry via the communication link upon detection of another mobile terminal being connected to the communication link.

21. The method of claim 3, wherein initiating an inquiry comprises forwarding an inquiry via the communication link at preset time intervals.

22. The method of claim 1, wherein forwarding a response comprises automatically forwarding a response upon receipt of the inquiry.

23. The method of claim 1, wherein forwarding a response comprises informing a user of the receipt of an inquiry and the user manually forwarding the response subsequent thereto.

24. The method of claim 2, wherein forwarding a response comprises automatically forwarding a response upon receipt of the inquiry.

25. The method of claim 2, wherein forwarding a response comprises informing a user of the receipt of an inquiry and the user manually forwarding the response subsequent thereto.

26. The method of claim 3, wherein forwarding a response comprises automatically forwarding a response upon receipt of the inquiry.

27. The method of claim 3, wherein forwarding a response comprises informing a user of the receipt of an inquiry and the user manually forwarding the response subsequent thereto.

28. A grapevine driven updating method comprising:
  providing a first piece of updated data to a first mobile terminal
  initiating an inquiry from the first mobile terminal to a second mobile terminal via a communication link, the inquiry asking the second mobile terminal whether it wishes to receive any updated pieces of data;
  forwarding a first response from the second mobile terminal to the first mobile terminal via the communication link in response to the inquiry from the first mobile terminal, the first response acknowledging that it wishes to receive updated pieces of data;
  forwarding a list of updated pieces of data stored in the first mobile terminal from the first mobile terminal to the second mobile terminal via the communication link;
  forwarding a second response from the second mobile terminal to the first mobile terminal via the communication link, the second response indicating that it wishes to receive the first piece of updated data; and
  forwarding the first updated piece of data from the first mobile terminal to the second mobile terminal via the communication link.

29. The method of claim 28, further comprising:
  initiating an inquiry from the second mobile terminal to the first mobile terminal via the communication link, the inquiry asking the first mobile terminal whether it wishes to receive any updated pieces of data;
  forwarding a first response from the first mobile terminal to the second mobile terminal via the communication link in response to the inquiry from the second mobile terminal, the response acknowledging that it wishes to receive updated pieces of data;
  forwarding a list of updated pieces of data stored in the second mobile terminal from the second mobile terminal to the first mobile terminal via the communication link;
  forwarding a second response from the first mobile terminal to the second mobile terminal via the communication link, the second response indicating that it wishes to receive a second piece of updated data; and
  forwarding the second updated piece of data from the first mobile terminal to the second mobile terminal via the communication link.

30. The method of claim 28, further comprising:
  initiating an inquiry from the second mobile terminal to a third mobile terminal via the communication link, the inquiry asking the third mobile terminal whether it wishes to receive any updated pieces of data;
  forwarding a first response from the third mobile terminal to the second mobile terminal via the communication link in response to the inquiry from the second mobile terminal, the first response acknowledging that it wishes to receive updated pieces of data;

forwarding a list of updated pieces of data stored in the second mobile terminal from the second mobile terminal to the third mobile terminal via the communication link;

forwarding a second response from the third mobile terminal to the second mobile terminal via the communication link, the second response indicating that it wishes to receive a second piece of updated data; and forwarding the second updated piece of data from the second mobile terminal to the third mobile terminal via the communication link.

31. The method of claim 28, wherein the communication link comprises a low-power RF transmission system.

32. The method of claim 31, wherein the low-power RF system comprises the Bluetooth System.

33. The method of claim 28, wherein the communication link comprises an optical transmission system.

34. The method of claim 33, wherein the optical transmission system comprises an infrared transmission system.

35. The method of claim 29, wherein the communication link comprises a low-power RF transmission system.

36. The method of claim 35, wherein the low-power RF system comprises the Bluetooth System.

37. The method of claim 29, wherein the communication link comprises an optical transmission system.

38. The method of claim 37, wherein the optical transmission system comprises an infrared transmission system.

39. The method of claim 30, wherein the communication link comprises a low-power RF transmission system.

40. The method of claim 39, wherein the low-power RF system comprises the Bluetooth System.

41. The method of claim 30, wherein the communication link comprises an optical transmission system.

42. The method of claim 41, wherein the optical transmission system comprises an infrared transmission system.

43. The method of claim 28, wherein initiating an inquiry comprises forwarding an inquiry via the communication link upon detection of another mobile terminal being connected to the communication link.

44. The method of claim 28, wherein initiating an inquiry comprises forwarding an inquiry via the communication link at preset time intervals.

45. The method of claim 29, wherein initiating an inquiry comprises forwarding an inquiry via the communication link upon detection of another mobile terminal being connected to the communication link.

46. The method of claim 29, wherein initiating an inquiry comprises forwarding an inquiry via the communication link at preset time intervals.

47. The method of claim 30, wherein initiating an inquiry comprises forwarding an inquiry via the communication link upon detection of another mobile terminal being connected to the communication link.

48. The method of claim 30, wherein initiating an inquiry comprises forwarding an inquiry via the communication link at preset time intervals.

49. A program storage device readable by a machine, tangibly embodying a program of instructions executable by the machine to perform method steps for grapevine driven updating, the method steps comprising:

providing a first piece of updated data to a first mobile terminal;

initiating an inquiry from the first mobile terminal to a second mobile terminal via a communication link, the inquiry asking the second mobile terminal whether it wishes to receive the first updated piece of data;

forwarding a response from the second mobile terminal to the first mobile terminal via the communication link in response to the inquiry from the first mobile terminal, the response acknowledging that it wishes to receive the first updated piece of data; and forwarding the first updated piece of data from the first mobile terminal to the second mobile terminal via the communication link.

50. The device of claim 49, the method steps further comprising:

initiating an inquiry from the second mobile terminal to the first mobile terminal via the communication link, the inquiry asking the first mobile terminal whether it wishes to receive a second updated piece of data;

forwarding a response from the first mobile terminal to the second mobile terminal via the communication link in response to the inquiry from the second mobile terminal, the response acknowledging that it wishes to receive the second updated piece of data; and forwarding the second updated piece of data from the second mobile terminal to the first mobile terminal via the communication link.

51. The device of claim 49, the method steps further comprising:

initiating an inquiry from the second mobile terminal to a third mobile terminal via the communication link, the inquiry asking the third mobile terminal whether it wishes to receive the first updated piece of data;

forwarding a response from the third mobile terminal to the second mobile terminal via the communication link in response to the inquiry from the second mobile terminal, the response acknowledging that it wishes to receive the first updated piece of data; and forwarding the first updated piece of data from the second mobile terminal to the third mobile terminal via the communication link.

52. A program storage device readable by a machine, tangibly embodying a program of instructions executable by the machine to perform method steps for grapevine driven updating, the method steps comprising:

providing a first piece of updated data to a first mobile terminal;

initiating an inquiry from the first mobile terminal to a second mobile terminal via a communication link, the inquiry asking the second mobile terminal whether it wishes to receive any updated pieces of data;

forwarding a first response from the second mobile terminal to the first mobile terminal via the communication link in response to the inquiry from the first mobile terminal, the first response acknowledging that it wishes to receive updated pieces of data;

forwarding a list of updated pieces of data stored in the first mobile terminal from the first mobile terminal to the second mobile terminal via the communication link;

forwarding a second response from the second mobile terminal to the first mobile terminal via the communication link, the second response indicating that it wishes to receive the first piece of updated data; and forwarding the first updated piece of data from the first mobile terminal to the second mobile terminal via the communication link.

53. The device of claim 52, the method steps further comprising:

initiating an inquiry from the second mobile terminal to the first mobile terminal via the communication link, the inquiry asking the first mobile terminal whether it wishes to receive any updated pieces of data;

forwarding a first response from the first mobile terminal to the second mobile terminal via the communication link in response to the inquiry from the second mobile terminal, the response acknowledging that it wishes to receive updated pieces of data;

forwarding a list of updated pieces of data stored in the second mobile terminal from the second mobile terminal to the first mobile terminal via the communication link;

forwarding a second response from the first mobile terminal to the second mobile terminal via the communication link, the second response indicating that it wishes to receive a second piece of updated data; and forwarding the second updated piece of data from the first mobile terminal to the second mobile terminal via the communication link.

54. The device of claim 52, the method steps further comprising:

initiating an inquiry from the second mobile terminal to a third mobile terminal via the communication link, the inquiry asking the third mobile terminal whether it wishes to receive any updated pieces of data;

forwarding a first response from the third mobile terminal to the second mobile terminal via the communication link in response to the inquiry from the second mobile terminal, the first response acknowledging that it wishes to receive updated pieces of data;

forwarding a list of updated pieces of data stored in the second mobile terminal from the second mobile terminal to the third mobile terminal via the communication link;

forwarding a second response from the third mobile terminal to the second mobile terminal via the communication link, the second response indicating that it wishes to receive a second piece of updated data; and forwarding the second updated piece of data from the second mobile terminal to the third mobile terminal via the communication link.

55. A grapevine driven updating method according to claim 1, wherein the first piece of updated data comprises data that is to be shared by the first and second mobile terminals so that the first and second mobile terminals contain the same updated data.

56. A grapevine driven updating method according to claim 55, wherein the updated data comprises electronic business card data.

57. A grapevine driven updating method according to claim 55, wherein the updated data comprises a newer version of software previously installed in the first and second mobile terminals.

58. A grapevine driven updating method according to claim 55, wherein the updated data comprises a software patch.

59. A grapevine driven updating method according to claim 55, wherein the updated data is an upgrade to an operating system used by both the first and second mobile terminals.

60. A grapevine driven updating method according to claim 28, wherein the first piece of updated data comprises data that is to be shared by the first and second mobile terminals so that the first and second mobile terminals contain the same updated data.

61. A grapevine driven updating method according to claim 60, wherein the updated data comprises electronic business card data.

62. A grapevine driven updating method according to claim 60, wherein the updated data comprises a newer version of software previously installed in the first and second mobile terminals.

63. A grapevine driven updating method according to claim 60, wherein the updated data comprises a software patch.

64. A grapevine driven updating method according to claim 60, wherein the updated data is an upgrade to an operating system used by both the first and second mobile terminals.

65. A program storage device according to claim 49, wherein the first piece of updated data comprises data that is to be shared by the first and second mobile terminals so that the first and second mobile terminals contain the same updated data.

66. A grapevine driven updating method according to claim 65, wherein the updated data comprises electronic business card data.

67. A grapevine driven updating method according to claim 65, wherein the updated data comprises a newer version of software previously installed in the first and second mobile terminals.

68. A grapevine driven updating method according to claim 65, wherein the updated data comprises a software patch.

69. A grapevine driven updating method according to claim 65, wherein the updated data is an upgrade to an operating system used by both the first and second mobile terminals.

70. A mobile terminal device for transmitting grapevine updates comprising:

a transceiver:

for transmitting an inquiry from a first mobile terminal to a second mobile terminal via a communication link, the inquiry asking the second mobile terminal whether the second mobile terminal wishes to receive a first updated piece of data, for transmitting the first updated piece of data from the first mobile terminal to the second mobile terminal via the communication link, and for receiving a response from the second mobile terminal to the first mobile terminal via the communication link in response to the inquiry from the first mobile terminal, the response acknowledging that the second receiver wishes to receive the first updated piece of data.

71. A mobile terminal device for receiving grapevine updates comprising:

a transceiver:

for receiving an inquiry from a first mobile terminal to a second mobile terminal via a communication link, the inquiry asking the second mobile terminal whether the second mobile terminal wishes to receive a first updated piece of data, for receiving the first updated piece of data from the first mobile terminal to the second mobile terminal via the communication link, and for transmitting a response from the second mobile terminal to the first mobile terminal via the communication link in response to the inquiry from the first mobile terminal, the response acknowledging that the second receiver wishes to receive the first updated piece of data.

* * * * *